(12) United States Patent
Bhatnagar et al.

(10) Patent No.: US 7,642,206 B1
(45) Date of Patent: Jan. 5, 2010

(54) CERAMIC FACED BALLISTIC PANEL CONSTRUCTION

(75) Inventors: Ashok Bhatnagar, Richmond, VA (US); Lori L. Wagner, Richmond, VA (US); Harold Lindley Murray, Jr., North East, MD (US); Brian D. Arvidson, Chester, VA (US); Madhusudhan Rammoorthy, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 493 days.

(21) Appl. No.: 11/388,904

(22) Filed: Mar. 24, 2006

(51) Int. Cl.
*B32B 27/04* (2006.01)
*B32B 27/12* (2006.01)
*B32B 9/00* (2006.01)

(52) U.S. Cl. .............. 442/135; 442/134; 442/381; 428/102; 428/113

(58) Field of Classification Search .............. 442/135
See application file for complete search history.

(56) References Cited

U.S. PATENT DOCUMENTS

| | | | |
|---|---|---|---|
| 3,671,542 A | 6/1972 | Kwolek et al. | 524/157 |
| 3,975,487 A | 8/1976 | Cottis et al. | 264/210.6 |
| 4,118,372 A | 10/1978 | Schaefgen | 528/190 |
| 4,137,394 A | 1/1979 | Meihuizen et al. | 528/100 |
| 4,161,470 A | 7/1979 | Calundann | 524/599 |
| 4,356,138 A | 10/1982 | Kavesh et al. | 264/164 |
| 4,413,110 A | 11/1983 | Kavesh et al. | 526/348.1 |
| 4,440,711 A | 4/1984 | Kwon et al. | 264/185 |
| 4,457,985 A | 7/1984 | Harpell et al. | 428/224 |
| 4,535,027 A | 8/1985 | Kobashi et al. | 428/364 |
| 4,599,267 A | 7/1986 | Kwon et al. | 428/364 |
| 4,623,574 A | 11/1986 | Harpell et al. | 428/113 |
| 4,737,402 A * | 4/1988 | Harpell et al. | 442/187 |
| 4,748,064 A | 5/1988 | Harpell et al. | 428/113 |
| 4,916,000 A | 4/1990 | Li et al. | 428/105 |
| 5,165,989 A | 11/1992 | Bhatnagar et al. | 428/245 |
| 5,173,138 A | 12/1992 | Blauch et al. | 156/177 |
| 5,185,195 A * | 2/1993 | Harpell et al. | 428/102 |
| 5,286,833 A | 2/1994 | Bubeck et al. | 528/183 |
| 5,296,185 A | 3/1994 | Chau et al. | 264/205 |
| 5,356,584 A | 10/1994 | Bubeck et al. | 264/205 |
| 5,534,205 A | 7/1996 | Faley et al. | 264/103 |
| 5,674,969 A | 10/1997 | Sikkema et al. | 528/183 |
| 5,702,657 A | 12/1997 | Yoshida et al. | 264/112 |
| 5,766,725 A | 6/1998 | Hogenboom et al. | 428/113 |
| 5,939,553 A | 8/1999 | Reichwein et al. | 546/250 |
| 5,945,537 A | 8/1999 | Sikkema | 546/307 |
| 6,040,050 A | 3/2000 | Kitagawa et al. | 428/364 |
| 6,040,478 A | 3/2000 | Sikkema et al. | 562/424 |
| 6,642,159 B1 | 11/2003 | Bhatnagar et al. | 442/134 |
| 2004/0092183 A1* | 5/2004 | Geva et al. | 442/134 |
| 2005/0153098 A1 | 7/2005 | Bhatnagar et al. | 428/113 |
| 2007/0089596 A1* | 4/2007 | Huber et al. | 89/36.02 |

FOREIGN PATENT DOCUMENTS

| | | |
|---|---|---|
| GB | 2130073 | 12/1988 |
| GB | 2276934 | 10/1994 |
| GB | 2364956 | 2/2002 |
| WO | WO 0159395 | 8/2001 |

\* cited by examiner

*Primary Examiner*—D. Lawrence Tarazano
*Assistant Examiner*—Altrev C Sykes
(74) *Attorney, Agent, or Firm*—Erika S. Wilson

(57) ABSTRACT

A ballistic resistant panel which is formed from a ceramic layer and a plurality of fibrous backing layers. A first fibrous backing layer is adjacent to the ceramic layer, and a second fibrous backing layer is adjacent to the first fibrous backing layer. Each of the fibrous backing layers are formed from a network of high tenacity fibers, but the fibers of each of the backing layers have a different composition. Preferably, the first fibrous layer is stiffer than the second fibrous layer. The panel has a ballistic resistance which is substantially equivalent to or higher than the ballistic resistance of a comparable ceramic panel construction that has only a single fibrous layer of the same type of high tenacity fibers as are in the first and second fibrous backing layers, for substantially the same areal density.

25 Claims, No Drawings

CERAMIC FACED BALLISTIC PANEL CONSTRUCTION

BACKGROUND OF THE INVENTION

1. Field of the Invention

This invention relates to ballistic armor which includes a ceramic facing layer.

2. Description of the Related Art

Various types of ballistic armor constructions have been proposed and utilized in different applications. These include armor for land vehicles, aircraft, body armor, stationary objects, and the like. In one type of known ballistic armor construction that is useful, for example, in land vehicles and aircraft, a ceramic plate is adhered to a layer of high tenacity fibers. The ceramic plate is designed to face outwardly in the construction, acting as the primary layer that provides initial protection against ballistic projectiles. These structures are referred to as ceramic faced panels. These panels in general are effective in absorbing and dissipating kinetic energy from projectiles and projectile fragments.

High tenacity fibers that are useful in such applications include high molecular weight polyethylene fibers, aramid fibers, and the like. However, high tenacity fibers are in general difficult to manufacture due to complex manufacturing procedures. As a result, manufacturing capacity has been restricted, and can usually not be quickly increased in times of special needs. For example, there may be times of increased needs for military applications, which may conflict with needs for commercial applications, and such needs may be unfulfilled.

Consequently, there may be times when there are shortages of one type of high tenacity fiber, and the mere substitution of one type of high tenacity fiber for another type of high tenacity fiber may not meet the performance requirements of a particular end use application. Such substitution may also not have been pre-qualified for the particular application.

Moreover, weight considerations usually do not permit the use of thicker ceramic plates as a substitute for the high tenacity fiber layer.

It would be desirable to provide a ceramic faced ballistic resistant panel which met the necessary ballistic requirements but which had a construction that was more adaptable to meet the ever changing needs of customers.

SUMMARY OF THE INVENTION

In accordance with this invention, there is provided a ballistic resistant panel, the panel comprising:

an outwardly facing ceramic layer having an outer facing surface and an inner facing surface;

a first fibrous layer comprising a network of a first type of high tenacity fibers and having an outer facing surface and an inner facing surface, the outer facing surface of the first fibrous layer being adjacent to the inner facing surface of the ceramic layer; and a second fibrous layer comprising a network of a second type of high tenacity fibers and having an outer facing surface and inner facing surface, the outer facing surface of the second fibrous layer being adjacent to the inner facing surface of the first fibrous layer;

the first type of high tenacity fibers having a composition different from the composition of the second type of high tenacity fibers;

the first fibrous layer being stiffer than the second fibrous layer.

Preferably, the panel has a ballistic resistance which is substantially equivalent to or higher than the ballistic resistance of a comparable ceramic panel construction that has only a single fibrous layer comprising the same type of high tenacity fibers as the first or second type of high tenacity fibers, which single fibrous layer has an areal density substantially the same as the combined areal density of the first fibrous layer and the second fibrous layer.

Also in accordance with this invention, there is provided a ballistic resistant panel, the panel comprising:

an outwardly facing ceramic layer having an outer facing surface and an inner facing surface;

a first fibrous layer comprising a network of a first type of high tenacity fibers selected from the group consisting of aramid fibers and high molecular weight polyethylene fibers, and having an outer facing surface and an inner facing surface, the outer facing surface of the first fibrous layer being adjacent to the inner facing surface of the ceramic layer; and a second fibrous layer comprising a network of a second type of high tenacity fibers selected from the group consisting of aramid fibers and high molecular weight polyethylene fibers, and having an outer facing surface and inner facing surface, the outer facing surface of the second fibrous layer being adjacent to the inner facing surface of the first fibrous layer;

the first type of high tenacity fibers having a composition different from the composition of the second type of high tenacity fibers;

the first fibrous layer having a flexural modulus which is at least about 5% higher than the flexural modulus of the second fibrous layer.

In further accordance with this invention, there is provided a ballistic resistant panel, the panel comprising:

an outwardly facing ceramic layer having an outer facing surface and an inner facing surface, the ceramic layer comprising silicon carbide;

a first fibrous layer comprising a network of a first type of high tenacity fibers selected from the group consisting of aramid fibers and high molecular weight polyethylene fibers, and having an outer facing surface and an inner facing surface, the outer facing surface of said first fibrous layer being adjacent to the inner facing surface of said ceramic layer; and a second fibrous layer comprising a network of a second type of high tenacity fibers selected from the group consisting of aramid fibers and high molecular weight polyethylene fibers, and having an outer facing surface and inner facing surface, the outer facing surface of the second fibrous layer being adjacent to the inner facing surface of the first fibrous layer;

each of the first and second fibrous layers being in the form of a non-woven unidirectionally oriented network of fibers with a resin matrix, the first type of high tenacity fibers having a composition different from the composition of the second type of high tenacity fibers;

the first fibrous layer having a flexural modulus which is at least about 15% higher than the flexural modulus of the second fibrous layer, whereby the panel has a ballistic resistance which is substantially equivalent to or higher than the ballistic resistance of a comparable ceramic panel construction that has only a single fibrous layer comprising the same type of high tenacity fibers as the first or second type of high tenacity fibers, which single fibrous layer has an areal density substantially the same as the combined areal density of the first fibrous layer and the second fibrous layer.

The present invention provides a ballistic resistant panel which has a plurality of layers of different fibers that provide the backface protection on a ceramic plate. It has also been found that the fibrous layer adjacent to the ceramic layer should be stiffer than the interior facing fibrous layer in order to provide improved resistance to ballistic threats. It has been unexpectedly found that by using, for example, a layer of aramid fibers as the first fibrous layer and a layer of high molecular weight polyethylene fibers as the second fibrous layer, enhanced ballistic protection is achieved when compared with a backing layer that is formed solely from aramid fibers but with an equivalent areal density.

Providing a plurality of fibrous backing layers using different fiber types permits great flexibility in meeting the demands of customers for various ballistic threats in that the several fiber layers can be substituted for a single fiber layer and obtain at least the same degree of protection. In this way, the availability of ballistic resistant panels is not disrupted due to the limited supply of a single type of fibrous material. This also permits greater manufacturing flexibility and helps to reduce costs.

DETAILED DESCRIPTION OF THE INVENTION

As mentioned above, the ballistic panels of this invention are formed from a ceramic material and a plurality of fibrous layers of high tenacity fibers. The ceramic material may be in the form of a monolithic structure or in the form of individual smaller ceramic tiles that are connected together in some fashion (e.g., adhered on a support layer or on a fibrous layer). Although a single ceramic layer is preferred, depending on the end use application and weight considerations a plurality of ceramic layers may be employed in the construction of this invention. Such ceramic layers which are useful in ballistic applications are known in the art.

Typical ceramic materials useful in the panels of this invention include metal and non-metal nitrides, borides, carbides, oxides and the like, and mixtures thereof. Specific materials include silicon carbide, silicon oxide, silicon nitride, boron carbide, boron nitride, titanium diboride, alumina, magnesium oxide, and the like, as well as mixtures thereof. A preferred ceramic material is silicon carbide.

The ceramic layer may be unreinforced or reinforced such as with a fibrous material, and are available from a number of sources. For example, the ceramic layer may be bonded to or wrapped with glass fibers, graphite fibers, or the like. The ceramic layer may be of any desired thickness, recognizing of course that there are weight considerations in the selection of the thickness of the ceramic layer. Such layer may have a thickness, for example, of from about 0.7 to about 1 inch (1.78 to 25.4 mm), preferably from about 0.1 to about 0.5 inch (2.54 to 1.27 mm), and more preferably from about 0.1 to about 0.4 inch (2.54 to 10.16 mm). A ceramic layer of silicon carbide having a thickness of about 0.145 inch (3.68 mm) typically may an areal density of about 2.50 psf (12.2 ksm).

The various layers of this invention are generally of rectangular or square configuration, although other shapes may be employed, such as curved layers. The ceramic layer has an outer surface and an inner surface.

Adjacent to the inner surface of the ceramic layer is a first fibrous layer, which is preferably adhered thereto by a suitable adhesive means. The first fibrous layer also has inner and outer surfaces, and the outer surface of the first fibrous layer is adjacent to the inner surface of the ceramic layer. Adjacent to the first fibrous layer is a second fibrous layer. This layer also has inner and outer surfaces, and the outer surface of the second fibrous layer is adjacent to the inner surface of the first fibrous layer. Preferably, the first and second fibrous layers are adhered to each other.

Both of the first and second fibrous layers comprise high tenacity fibers. As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers have tenacities equal to or greater than about 10 g/d, more preferably equal to or greater than about 16 g/d, even more preferably equal to or greater than about 22 g/d, and most preferably equal to or greater than about 28 g/d.

For the purposes of the present invention, a fiber is an elongate body the length dimension of which is much greater that the transverse dimensions of width and thickness. Accordingly, the term fiber includes monofilament, multifilament, ribbon, strip, staple and other forms of chopped, cut or discontinuous fiber and the like having regular or irregular cross-section. The term "fiber" includes a plurality of any of the foregoing or a combination thereof. A yarn is a continuous strand comprised of many fibers or filaments.

The cross-sections of fibers useful herein may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably substantially circular.

Each of the first and second fibrous layers comprise a network of fibers. The fibers may be in the form of woven, knitted or non-woven fabrics. Preferably, at least 50% by weight of the fibers in the fabric are high tenacity fibers, more preferably at least about 75% by weight of the fibers in the fabric are high tenacity fibers, and most preferably substantially all of the fibers in the fabrics are high tenacity fibers.

The yarns and fabrics used herein may be comprised of one or more different high strength fibers. The yarns may be in essentially parallel alignment, or the yarns may be twisted, over-wrapped or entangled. The fabrics employed herein may be woven with yarns having different fibers in the warp and weft directions, or in other directions.

High tenacity fibers useful in the yarns and fabrics of the invention include highly oriented high molecular weight polyolefin fibers, particularly high modulus polyethylene fibers, aramid fibers, polybenzazole fibers such as polybenzoxazole (PBO) and polybenzothiazole (PBT), polyvinyl alcohol fibers, polyacrylonitrile fibers, liquid crystal copolyester fibers, glass fibers, carbon fibers or basalt or other mineral fibers, as well as rigid rod polymer fibers, and mixtures and blends thereof. Preferred high strength fibers useful in this invention include polyolefin fibers and aramid fibers. Most preferred are high molecular weight polyethylene fibers and aramid fibers.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers (also referred to as high molecular weight or extended chain polyethylene fibers) are preferred as one of the fibers useful in the fibrous layers of this invention. Such fibers are sold under the trademark SPECTRA® by Honeywell International Inc. of Morristown, N.J., USA.

Depending upon the formation technique, the draw ratio and temperatures, and other conditions, a variety of properties can be imparted to these fibers. The tenacity of the fibers are at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least about 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of aramid fibers, suitable fibers formed from aromatic polyamides are described in U.S. Pat. No. 3,671,542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 23 g/d, a modulus of at least about 500 g/d and an energy-to-break of at least about 30 J/g. For example, poly(p-phenylene terephthalamide) filaments which have moderately high moduli and tenacity values are particularly useful in forming ballistic resistant composites. Examples are Twaron® T2000 from Teijin which has a denier of 1000. Other examples are Kevlar® 29 which has 500 g/d and 22 g/d as values of initial tensile modulus and tenacity, respectively, as well as Kevlar® 129 and KM2 which are available in 400, 640 and 840 deniers from du Pont. Aramid fibers from other manufacturers can also be used in this invention. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers sold by du Pont under the trade name Nomex®.

High molecular weight polyvinyl alcohol (PV-OH) fibers having high tensile modulus are described in U.S. Pat. No. 4,440,711 to Kwon et al., which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/d, a tenacity preferably at least about 10 g/d, more preferably at least about 14 g/d and most preferably at least about 17 g/d, and an energy to break of at least about 8 J/g. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of preferably at least about 10 g/d and an energy to break of at least about 8 J/g. PAN fiber having a molecular weight of at least about 400,000, a tenacity of at least about 15 to 20 g/d and an energy to break of at least about 8 J/g is most useful; and such fibers are disclosed, for example, in U.S. Pat. No. 4,535,027.

Suitable liquid crystal copolyester fibers for the practice of this invention are disclosed, for example, in U.S. Pat. Nos. 3,975,487; 4,118,372 and 4,161,470.

Suitable polybenzazole fibers for the practice of this invention are disclosed, for example, in U.S. Pat. Nos. 5,286,833, 5,296,185, 5,356,584, 5,534,205 and 6,040,050. Preferably, the polybenzazole fibers are Zylon® brand polybenzoxazole fibers from Toyobo Co.

Rigid rod fibers are disclosed, for example, in U.S. Pat. Nos. 5,674,969, 5,939,553, 5,945,537 and 6,040,478. Such fibers are available under the designation M5® fibers from Magellan Systems International.

Additional backing fibrous layers formed from high tenacity fibers may also be employed in the panels of this invention, such as a third fibrous layer, a fourth fibrous layer, etc. These layers may be located inwardly of the second fibrous layer, or between the first and second fibrous layers, or both between the first and second fibrous layers and inwardly of the second fibrous layers.

As mentioned above, the fibrous layers may be in the form of a woven, knitted or non-woven fabric. If the fabric is a woven fabric, it may be of any desired weave, such as open weave pattern.

Preferably, the fibrous layers are in the form of a non-woven fabric, such as plies of unidirectionally oriented fibers, or fibers which are felted in a random orientation, which are embedded in a suitable resin matrix, as is known in the art. Fabrics formed from unidirectionally oriented fibers typically have one layer of fibers which are aligned parallel to one another along a common fiber direction, and a second layer of unidirectionally oriented fibers aligned parallel to one another along a common fiber direction which is 90° from the direction of the first fibers. Where the individual plies are unidirectionally oriented fibers, the successive plies are preferably rotated relative to one another, for example at angles of 0°/90°, 0°/90°/0°/90° or 0°/45°/90°/45°/0°, or at other angles. Such rotated unidirectional alignments are described, for example, in U.S. Pat. Nos. 4,623,574; 4,737,402; 4,748,064; and 4,916,000.

The fibrous layer or layers are preferably in a resin matrix. The resin matrix for the fiber plies may be formed from a wide variety of elastomeric materials having desired characteristics. In one embodiment, the elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa). These resinous materials are typically thermoplastic in nature but thermosetting materials are also useful.

Alternatively, the resin matrix may be selected to have a high tensile modulus when cured, as at least about $1 \times 10^6$ psi (6895 MPa). Examples of such materials are disclosed, for example, in U.S. Pat. No. 6,642,159, the disclosure of which is expressly incorporated herein by reference to the extent not inconsistent herewith.

The proportion of the resin matrix material to fiber in the composite layers may vary widely depending upon the end use. The resin matrix material preferably forms about 1 to about 98 percent by weight, more preferably from about 5 to about 95 percent by weight, and most preferably from about 5 to about 40 percent by weight, of the total weight of the fibers and resin matrix.

A wide variety of materials may be utilized as the resin matrix, including thermoplastic and thermosetting resins. For example, any of the following materials may be employed: polybutadiene, polyisoprene, natural rubber, ethylene-propylene copolymers, ethylene-propylene-diene terpolymers, polysulfide polymers, thermoplastic polyurethanes, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, and copolymers of ethylene. Examples of thermosetting resins include those which are soluble in carbon-carbon saturated solvents such as methyl ethyl ketone, acetone, ethanol, methanol, isopropyl alcohol, cyclohexane, ethyl acetone, and combinations thereof. Among the thermosetting resins are vinyl esters, styrene-butadiene block copolymers, diallyl phthalate, phenol formaldehyde, polyvinyl butyral and mixtures thereof, as disclosed in the aforementioned U.S. Pat. No. 6,642,159. Preferred thermosetting resins for polyethylene fiber fabrics include at least one vinyl ester, diallyl phthalate, and optionally a catalyst for curing the vinyl ester resin.

One preferred group of materials are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type R-$(BA)_x$(x=3-150); wherein A is a block from a polyvinyl aromatic monomer and B is a block from a conjugated diene elastomer. A preferred resin matrix is an isoprene-styrene-isoprene block copolymer, such as Kraton® D1107 isoprene-styrene-isoprene block copolymer available from Kraton Polymer LLC.

Another preferred resin matrix is a thermoplastic polyurethane, such as a copolymer mix of polyurethane resins in water.

The resin material may be compounded with fillers such as carbon black, silica, etc and may be extended with oils and vulcanized by sulfur, peroxide, metal oxide or radiation cure systems using methods well known to rubber technologists. Blends of different resins may also be used.

In general, the fibrous layers of the invention are preferably formed by constructing a fiber network initially and then coating the network with the matrix composition. As used herein, the term "coating" is used in a broad sense to describe a fiber network wherein the individual fibers either have a continuous layer of the matrix composition surrounding the fibers or a discontinuous layer of the matrix composition on the surfaced of the fibers. In the former case, it can be said that the fibers are fully embedded in the matrix composition. The terms coating and impregnating are interchangeably used herein. The fiber networks can be constructed via a variety of methods. In the preferred case of unidirectionally aligned fiber networks, yarn bundles of the high tenacity filaments are supplied from a creel and led through guides and one or more spreader bars into a collimating comb prior to coating with the matrix material. The collimating comb aligns the filaments coplanarly and in a substantially unidirectional fashion.

The matrix resin composition may be applied in any suitable manner, such as a solution, dispersion or emulsion, onto the fibrous layer, preferably a unidirectional fiber network. The matrix-coated fiber network is then dried. The solution, dispersion or emulsion of the matrix resin may be sprayed onto the filaments. Alternatively, the filament structure may be coated with the aqueous solution, dispersion or emulsion by dipping or by means of a roll coater or the like. After coating, the coated fibrous layer may then be passed through an oven for drying in which the coated fiber network layer (unitape) is subjected to sufficient heat to evaporate the water or other liquid in the matrix composition. The coated fibrous network may then be placed on a carrier web, which can be a paper or a film substrate, or the fibers may initially be placed on a carrier web before coating with the matrix resin. The substrate and the unitape can then be wound up into a continuous roll in a known manner.

The yarns useful in the fibrous layers may be of any suitable denier, such as from about 50 denier to about 3000 denier. The selection is governed by considerations of desired properties and cost. Finer yarns are more costly to manufacture and to weave, but can produce better properties (such as greater ballistic effectiveness per unit weight). The yarns are preferably from about 200 denier to about 3000 denier. More preferably, the yarns are from about 650 denier to about 1500 denier. Most preferably, the yarns are from about 800 denier to about 1300 denier.

As mentioned above, the fibers in the first and second fibrous layers have different compositions. Preferred among the high tenacity fibers listed above for such layers are extended chain polyethylene fibers and aramid fibers. The weight ratio of the first and second fibrous layers may vary as desired. Preferably, the weight ratio of the first fibrous layer to the second fibrous layer ranges from about 10:1 to about 1:10, more preferably from about 3:1 to about 1:3, and most preferably from about 1.5:1 to about 1:1.5. In a most preferred embodiment, the first and second fibrous layers have approximately the same weight. The thickness of the combined first and second fibrous layers may also vary, depending upon the specific application, cost and weight limitations. For example, the combined thickness of the first and second fibrous layers may range from about 0.1 to about 0.8 inch (2.54 to 20.32 mm), more preferably from about 0.2 to about 0.6 inch (5.08 to 15.24 mm), and most preferably from about 0.3 to about 0.5 inch (7.62 to 12.70 mm).

It is preferred that the first fibrous layer has a flexural modulus which is higher than the flexural modulus of the second fibrous layer. The flexural modulus that is being referred to in this instance is the flexural modulus of the entire fibrous layer (including resin matrix). Thus, the layer adjacent to the ceramic layer (the first fibrous layer) is stiffer than the layer that is separated from the ceramic layer (the second fibrous layer).

Preferably, the flexural modulus of the first fibrous layer is at least about 5% higher than the flexural modulus of the second fibrous layer. More preferably, the flexural modulus of the first fibrous layer is at least about 15% higher than the flexural modulus of the second fibrous layer. Most preferably, the flexural modulus of the first fibrous layer is at least about 25% higher than the flexural modulus of the second fibrous layer. As used herein, flexural modulus is determined in accordance with ASTM D790 at room temperature.

In one preferred embodiment the first fibrous layer is formed from high molecular weight polyethylene fibers in the form of a unidirectional non-woven fabric or a woven fabric, and the second fibrous layer is formed from aramid fibers that are either in the form of a woven fabric or in the form of a unidirectional non-woven fabric. In another preferred embodiment the first fibrous layer is formed from aramid fibers that are either in the form of a woven fabric or in the form of a unidirectional non-woven fabric and the second fibrous layer is formed from high molecular weight polyethylene fibers in the form of a unidirectional non-woven fabric or a woven fabric.

Also, preferably the first and second fibrous layers (as well as any additional fibrous layers) are formed of a plurality of plies which have been laminated together. The number of plies in each layer is dependent on the desired areal density, thickness, protection level, and the like. For example, when the fibrous layer is formed from either high molecular weight polyethylene fibers or aramid fibers, the number of individual plies may range from about 2 to about 200, more preferably from about 10 to about 150, and most preferably from about 50 to about 100. It should be recognized that the individual plies may be preformed into a multiply prepreg. For example, if the prepreg is formed from 4 plies, then the number of plies mentioned previously would be reduced to one-quarter of the amounts stated.

The individual plies are also preferably in the form of subassemblies of two or four units which include cross-plied, preferably at 0°/90° for a two ply unit and at 0°/90°/0°/090° for a four ply unit. The fibrous layers may be formed from a plurality of such cross-plied units.

Laminates of two or more plies that form the fibrous layers of the invention are preferably produced from continuous rolls of unidirectional prepregs, using a continuous cross-ply operation. One such method is described in U.S. Pat. Nos. 5,173,138 and 5,766,725, hereby incorporated by reference to the extent not incompatible herewith. Alternatively, the plies may be layed up by hand, or by any other suitable means. The plies (for example, two plies) are consolidated by the application of heat and pressure in the cross-plying process. Temperatures may range from about 90° to about 160° C., and pressures may range from about 100 to about 2500 psi (69 to 17,0000 kPa), depending upon the type of fibers and matrix sheet that is employed. By "consolidating" is meant that the matrix material and the fibrous plies are combined into a single unitary layer. Consolidation can occur by drying, cooling, heating, pressure or a combination thereof.

Assemblies of the various plies that constitute the fibrous layers of this invention may comprise rigid assemblies or flexible assemblies. Rigid assemblies are usually formed by stacking and consolidating the plies in a press, such as under the conditions mentioned above. Flexible assemblies may be formed by loosely stacking the plies, in which the plies are either unattached or attached only at one or more edges by stitching, for example.

The degree of flexibility of each fibrous layer depends upon the fibers and resins employed, as well as the processing conditions. These considerations are known to those skilled in the art.

One or more plastic films can be included in the fibrous layers, for example to permit different layers to slide over each other for ease of forming into a desired shape. These plastic films may typically be adhered to one or both surfaces of each fibrous layer or each consolidated prepreg two- or four-plies that form the fibrous layers. Any suitable plastic film may be employed, such as films made of polyolefins, e.g., linear low density polyethylene (LLDPE) films and ultrahigh molecular weight polyethylene (UHMWPE) films, as well as polyester films, nylon films, polycarbonate films and the like. These films may be of any desirable thickness. Typical thicknesses range from about 0.1 to about 1.2 mils (2.5 to 30 μm), more preferably from about 0.2 to about 1 mil (5 to 25 μm), and most preferably from about 0.3 to about 0.5 mils (7.5 to 12.5 μm). Most preferred are films of LLDPE.

In addition to the fibrous layers of high tenacity fibers that are present in the composite material of this invention, there may also be employed other layers. For example, a fiber glass composite and/or a graphite composite may be interposed between the first fibrous layer and the ceramic layer. Such composites may be formed with a desired resin, such as a thermosetting epoxy resin. If present, such additional layer(s) desirably have a flexural modulus that is higher than that of the first fibrous layer. Alternatively, such composite materials may be present in other locations in the article of this invention.

In one particularly preferred embodiment of this invention, the ceramic layer is formed from silicon carbide, the first fibrous layer is formed from aramid fibers, the second fibrous layer is formed from high molecular weight polyethylene fibers, and the areal density of the first and second fibrous layers is approximately the same.

Preferably, the ceramic layer and the first and second fibrous layers are adhered together under suitable conditions, such as merely by bonding at room temperature, or bonding under suitable heat and pressure. Any suitable means can be used to attach the layers together, such as a solid adhesive film, a liquid adhesive, etc. Adhesive films are preferred, such as polyurethane adhesives, epoxy adhesives, polyethylene adhesives, and the like. If heat and pressure are used to bond the layers together, preferably the temperatures employed are preferably about 20 to about 30° F. (11.1 to 16.7° C.) lower than the temperature used in the consolidation of the fibrous layers mentioned above, or about 20 to about 30° F. (11.1 to 16.7° C.) lower than the melting point of the fibers used in the fibrous backing layers. Pressures can be lower than those used in the consolidation of the fibrous layers, such as about 20 to about 500 psi (0.14 to 3.4 MPa). If an autoclave is employed, the pressures may range, for example, from about 50 to about 250 psi (0.34 to 1.7 MPa). Preferably the first and second fibrous layers are first assembled together (such as by molding under suitable heat and pressure), preferably without an adhesive, prior to being bonded to the ceramic layer.

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1

Comparative

A ceramic faced panel was prepared from a ceramic tile. The tile was a silicon carbide ceramic (SiC-N, available from Cercom Ceramics, and which is reported by the manufacturer to have a bulk density of 3.20 g/cm$^3$, an average grain size of 3-5 µm, and a flexural strength (4-pt MOR at room temperature) of 85 ksi (586 MPa)). Four tiles were used, each with a thickness of 0.145 inch (3.68 mm), an areal density of 2.50 psf (12.2 ksm) and in the form of a 5.25×5.25 inch (13.34×13.34 cm) plate.

A fibrous layer was formed from a four-ply high molecular weight polyethylene fiber composite (SPECTRA SHIELD® PCR from Honeywell International Inc.). This material was a non-woven unidirectionally oriented structure, with a matrix resin (16% by weight of Kraton® D1107 isoprene-styrene-isoprene block copolymer available from Kraton Polymer LLC). The 4-ply structure included individual plies that were cross-plied 0°/90°/0°/90°. The SPECTRA® polyethylene fibers have a tenacity of 30 g/d, a tensile modulus of 850 g/d and an energy-to-break of 45 g/d.

A total of 42 layers of the 4-ply prepreg were cut to a 12×12 inch (30.48×30.48 cm) size and stacked, with each prepreg being oriented 90° with respect to an adjacent prepreg layer. The stack of prepregs was molded at 240° F. (116° C.) at a pressure of 1500 psi (10.3 MPa) for 10 minutes, followed by cooling. The fibrous backing layer had an areal density of 2.05 psf (10.0 ksm), a thickness of 0.422 inch (10.72 mm) and a flexural modulus of 117.5 ksi (809.6 MPa).

Four ceramic plates were mounted on the molded high molecular weight polyethylene non-woven fabric layer using an adhesive film, and the combined structure was consolidated in an autoclave at 240° F. (116° C.) at a pressure of 100 psi (0.69 MPa). The adhesive film was a polyether aliphatic polyurethane available from Stevens Urethane which has a melting range of 120 to 140° C., an elongation at break of 450% and a specific gravity of 1.07 g/cc. The total areal density was 4.55 psf (22.2 ksf). After removal from the autoclave, the entire panel was wrapped with SPECTRA SHIELD® PCR non-woven fabric in both directions, for testing purposes. The wrapping of the panel permits the ceramic material to retain its integrity (not expel shattered components) even after several ballistic impacts.

The panel was tested for ballistic performance in accordance with MIL-STD-662E. The projectile was a Russian Dragnov bullet (7.62×54 R LPS), weighing 149 grain. A clay backing material was used to determine back face deformation (Roma Plastilina #1, 4 inch (10 cm) thick). The results are shown in Table 1, below.

Example 2

Comparative

Example 1 was repeated using a different fibrous backing material. The backing material was formed from GOLD SHIELDS RS (from Honeywell International Inc.), which is a 4-ply aramid non-woven unidirectionally oriented structure with a matrix resin (16% by weight of a thermoplastic polyurethane resin, described by its manufacturer as being a copolymer mix of polyurethane resins in water. The 4-ply structure included individual plies that were cross-plied 0°/90°/0°/90°. The aramid fibers have a denier of 1000 and a tenacity of 26 g/d.

A total of 44 layers of the 4-ply prepreg were cut to the same size as in Example 1 and stacked, with each prepreg being oriented 90° with respect to an adjacent prepreg layer. The stack of prepregs was molded at 240° F. (116° C.) at a pressure of 1500 psi (10.3 MPa) for 10 minutes, followed by cooling. The fibrous backing layer had an areal density of 2.00 psf (9.76 ksm), a thickness of 0.324 inch (8.23 mm) and a flexural modulus of 159.0 ksi (1095.5 MPa).

Four ceramic plates were mounted on the molded aramid non-woven fabric layer using the adhesive film of Example 1, and the combined structure was consolidated in an autoclave as in Example 1. The total areal density was 4.50 psf (21.96 ksf). The entire panel was then wrapped with SPECTRA SHIELD® PCR non-woven fabric in both directions.

The panel was tested for ballistic properties, as in Example 1. The results are shown in Table 1, below.

Example 3

Example 1 was repeated, except that both a first high molecular weight polyethylene fibrous layer was used and a second aramid fibrous layer was used as the backing layers. The high molecular weight polyethylene layer was formed from a total of 20 layers of the 4-ply high molecular weight polyethylene prepreg of Example 1, and was used as the first fibrous backing layer. The aramid layer was formed from a total of 22 layers of the 4-ply aramid prepreg of Example 2, and was used as the second fibrous backing layer.

The combined layers were cut to the same size and stacked as in Example 1, with adjacent the adjacent plies of the high molecular weight polyethylene fibers and the aramid fibers being rotated 90° with respect to each other. The combined layers were molded under the conditions of Example 1. The combined fibrous backing layers had an areal density of 2.02 psf (9.86 ksm), a thickness of 0.374 inch (9.50 mm) and a flexural modulus of 211.6 ksi (1457.9 MPa).

Four ceramic plates were mounted on the molded combined high molecular polyethylene non-woven fabric layers and the aramid non-woven fabric layer using the adhesive film of Example 1, with the high molecular weight polyethylene layers adjacent to the ceramic plates. The combined structure was consolidated in an autoclave as in Example 1. The total areal density was 4.52 psf (22.05 ksf). The entire panel was then wrapped with SPECTRA SHIELD® PCR non-woven fabric in both directions.

The panel was tested for ballistic properties, as in Example 1. The results are shown in Table 1, below.

Example 4

Example 3 was repeated, except that arrangement of the high molecular weight polyethylene fibrous layer and the aramid fibrous layer was reversed, with the aramid layer forming the first fibrous layer (adjacent to the ceramic layer) and the high molecular weight polyethylene layer forming the second fibrous layer.

The combined layers were cut to the same size and stacked as in Example 1, with adjacent the adjacent plies of the high molecular weight polyethylene fibers and the aramid fibers being rotated 90° with respect to each other. The combined layers were molded under the conditions of Example 1. The combined fibrous backing layers had an areal density of 2.02 psf (9.86 ksm), a thickness of 0.371 inch (9.42 mm) and a flexural modulus of 193.9 ksi (1336.0 MPa).

Four ceramic plates were mounted on the molded combined high molecular polyethylene non-woven fabric layers and the aramid non-woven fabric layer using the adhesive film of Example 1, with the aramid layers adjacent to the ceramic plates. The combined structure was consolidated in an autoclave as in Example 1. The total areal density was 4.52 psf (22.05 ksf). The entire panel was then wrapped with SPECTRA SHIELD® PCR non-woven fabric in both directions.

The panel was tested for ballistic properties, as in Example 1. The results are shown in Table 1, below.

TABLE 1

| Example | Total Thickness inch (mm) | Total Areal Density, p/f² (kg/m²) | V50, fps (mps) | Deformation, (mm) |
|---|---|---|---|---|
| 1* | 0.567 (14) | 4.55 (22.2) | 2092 (638) | 41 |
| 2* | 0.469 (12) | 4.50 (21.9) | 2022 (616) | 35 |
| 3 | 0.519 (13) | 4.52 (22.0) | 2128 (649) | 36 |
| 4 | 0.516 (13) | 4.52 (22.0) | 2083 (635) | 38 |

*comparative

These examples demonstrate that the fibrous backed ceramic product of the invention has about the same or better ballistic resistance than a comparative material that is formed only from one type of fibrous backing layer. By comparing Examples 1 and 3, it can be seen that use of a separate aramid fibrous layer and a separate high molecular weight polyethylene fibrous layer (wherein about one-half of the aramid plies are substituted by high molecular weight polyethylene plies) yields an improved ballistic resistant panel compared with a panel formed of a single layer of aramid fibers (with the panels being of substantially the same areal density). In addition, the back face deformation was improved in the example of the invention. By comparing Examples 2 and 4, it can be seen that the use of a separate high molecular weight polyethylene fibrous layer and a separate aramid fibrous layer (wherein about one-half of the high molecular weight polyethylene plies are substituted by aramid plies) likewise yields an improved ballistic panel compared with a panel formed only of a single layer of high molecular weight polyethylene fibers (with the panels being of substantially the same areal density). In this case, the back face deformation is substantially similar.

Accordingly, it can be seen that the present invention provides a ceramic panel that is formed from at least two fibrous layers that have different fiber compositions, yet the ballistic resistance is not compromised. Indeed, the ballistic resistance increases when measured by the V50 property. This means that it is possible to substitute a ceramic backing of a single layer of high tenacity fibers with two layers of different high tenacity fibers (of substantially the same areal density) and achieve the required ballistic performance. As such, when one fibrous material may be in short supply it is possible to substitute a substantial portion of that material with another high tenacity fibrous material and still achieve the desired properties. This greatly adds to the flexibility of manufacturing and supplying panels for many critical applications.

The panels of this invention are particularly useful for ballistic protection of land vehicles and aircraft. They also useful as inserts for body armor, such as vests and helmets, in stationary devices as well as in homeland security applications.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A ballistic resistant panel, said panel comprising:
an outwardly facing ceramic layer having an outer facing surface and an inner facing surface, said ceramic layer having a thickness of from about 0.1 to about 0.5 inch;
a first fibrous layer comprising a network of aramid fibers and having an outer facing surface and an inner facing surface, said outer facing surface of said first fibrous layer being adjacent to said inner facing surface of said ceramic layer; and
a second fibrous layer comprising a network of high molecular weight polyethylene fibers and having an outer facing surface and inner facing surface, said outer facing surface of said second fibrous layer being adjacent to said inner facing surface of said first fibrous layer;
each of said first fibrous layer and said second fibrous layer being in the form of a plurality of individual plies of fiber with a resin matrix, the number of said plies in said first and second fibrous layers each being from about 10 to about 150;
the weight ratio of said first fibrous layer to said second fibrous layer ranging from about 3:1 to about 1:3;
said first fibrous layer being stiffer than said second fibrous layer and has a flexural modulus at least about 15% higher than the flexural modulus of said second fibrous layer,
wherein said panel has a ballistic resistance which is substantially equivalent to or higher than the ballistic resistance of a comparable ceramic panel construction that has only a single fibrous layer comprising the same type of fibers as said fibers of said first or second fibrous layers, which single fibrous layer has an areal density substantially the same as the combined areal density of said first fibrous layer and said second fibrous layer.

2. The panel of claim 1 wherein said first fibrous layer has a flexural modulus which is at least about 25% higher than the flexural modulus of said second fibrous layer.

3. The panel of claim 1 wherein said fibers of said first fibrous layer and said second fibrous layer have tenacities of at least about 22 g/d.

4. The panel of claim 1 wherein said fibers of said first fibrous layer and said second fibrous layer have tenacities of at least about 28 g/d.

5. The panel of claim 1 wherein at least one of said first fibrous layer and said second fibrous layer is in the form of a non-woven unidirectionally oriented network of fibers with said resin matrix.

6. The panel of claim 5 wherein said resin comprises from about 5 to about 40 percent by weight of said at least one of said first fibrous layer and second fibrous layer.

7. The panel of claim 5 wherein said at least one of said first and second fibrous layers comprise a plurality of individual plies that are oriented with respect to each other.

8. The panel of claim 7 wherein said plies are oriented at an angle of 90° with respect to adjacent plies.

9. The panel of claim 1 wherein both said first and second fibrous layers are in the form of a non-woven unidirectionally oriented network of fibers with said resin matrix.

10. The panel of claim 7 wherein both said first and second fibrous layers comprise a plurality of individual plies that are oriented with respect to each other, and wherein said panel has a ballistic resistance which is higher than the ballistic resistance of a composite panel construction that has only a single fibrous layer comprising the same type of fibers as said fibers of said first fibrous layer, which single fibrous layer has an areal density substantially the same as the combined areal density of said first fibrous layer and said second fibrous layer.

11. The panel of claim 1 wherein at least one of said first fibrous layer and said second fibrous layer is in the form of a woven fabric with said resin matrix.

12. The panel of claim 1 wherein said ceramic layer comprises a ceramic material selected from the group consisting of metal and non-metal nitrides, borides, carbides and oxides, and mixtures thereof.

13. The panel of claim 1 wherein said ceramic layer comprises a ceramic material selected from the group consisting of silicon carbide, silicon oxide, silicon nitride, boron carbide, boron nitride, titanium diboride, alumina and magnesium oxide, and mixtures thereof.

14. The panel of claim 1 wherein said ceramic layer comprises silicon carbide.

15. The panel of claim 1 further comprising a third fibrous layer interposed between said first fibrous layer and said ceramic layer, wherein the fibers of said third fibrous layer have a different composition from the fibers in said first fibrous layer and in said second fibrous layer.

16. The panel of claim 15 wherein said fibers of said third fibrous layer are selected from the group consisting of fiber glass and graphite fibers.

17. The panel of claim 1 further comprising at least one layer of a plastic film adhered to one or both surfaces of each fibrous layer.

18. The panel of claim 1 wherein each of said first and second fibrous layers comprise a plurality of prepregs comprising a plurality of fiber plies that are oriented with respect to each other.

19. The panel of claim 18 wherein said resin matrix of said first fibrous layer comprises a thermoplastic polyurethane resin and said resin matrix of said second fibrous layer comprises a styrene-isoprene-styrene block copolymer.

20. A ballistic resistant panel, said panel comprising:
an outwardly facing ceramic layer having an outer facing surface and an inner facing surface, said ceramic layer comprising silicon carbide, said ceramic layer having a thickness of from about 0.1 to about 0.4 inch;
a first fibrous layer comprising a network of aramid fibers, and having an outer facing surface and an inner facing surface, said outer facing surface of said first fibrous layer being bonded to said inner facing surface of said ceramic layer; and
a second fibrous layer comprising a network of high molecular weight polyethylene fibers, and having an outer facing surface and inner facing surface, said outer facing surface of said second fibrous layer being bonded to said inner facing surface of said first fibrous layer;
each of said first and second fibrous layers being in the form of a plurality of individual plies of a non-woven unidirectionally oriented network of fibers with a resin matrix, the number of said plies in said first and second fibrous layers each being from about 10 to about 150 and the individual plies being oriented with respect to each other,
the weight ratio of said first fibrous layer to said second fibrous layer ranging from about 1.5:1 to about 1:1.5;
said first fibrous layer having a flexural modulus which is at least about 15% higher than the flexural modulus of said second fibrous layer,
whereby said panel has a ballistic resistance which is substantially equivalent to or higher than the ballistic resistance of a comparable ceramic panel construction that has only a single fibrous layer comprising the same type of fibers as said fibers of said first or second fibrous layers, which single fibrous layer has an areal density substantially the same as the combined areal density of said first fibrous layer and said second fibrous layer.

21. The panel of claim 20 wherein said resin matrix of said first fibrous layer comprises a thermoplastic polyurethane resin which is applied as a copolymer mix of polyurethane resins in water and said resin matrix of said second fibrous layer comprises is a styrene-isoprene-styrene block copolymer.

22. The panel of claim 21 wherein said each of said first and second fibrous layers comprise a plurality of four plies of said network of fibers that are laminated to each other and cross-plied with respect to each other.

23. The panel of claim 22 wherein the denier of said fibers of said first fibrous layer and said fibers of said second fibrous layer is about 50 to about 3000.

24. The panel of claim 23 wherein said first fibrous layer is adhered to said ceramic layer by an adhesive film.

25. The panel of claim 1 wherein the areal density of said first fibrous layer is approximately the same as the areal density of said second fibrous layer and wherein said first fibrous layer has a flexural modulus which is at least about 25% higher than the flexural modulus of said second fibrous layer.

* * * * *

UNITED STATES PATENT AND TRADEMARK OFFICE
CERTIFICATE OF CORRECTION

PATENT NO. : 7,642,206 B1 Page 1 of 1
APPLICATION NO. : 11/388904
DATED : January 5, 2010
INVENTOR(S) : Bhatnagar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 590 days.

Signed and Sealed this

Sixteenth Day of November, 2010

David J. Kappos
*Director of the United States Patent and Trademark Office*